June 11, 1968  HARUO YOSHIHARA  3,387,688
BRAKING APPARATUS
Filed Dec. 16, 1966  4 Sheets-Sheet 2

Fig. 6

INVENTOR
HARUO YOSHIHARA
BY
Christel & Bean
ATTORNEY

INVENTOR
HARUO YOSHIHARA
BY Christel + Bean
ATTORNEY

United States Patent Office 3,387,688
Patented June 11, 1968

3,387,688
BRAKING APPARATUS
Haruo Yoshihara, 948 Totsuka-cho 3-chome,
Shinjuku-ku, Tokyo, Japan
Filed Dec. 16, 1966, Ser. No. 602,325
Claims priority, application Japan, Dec. 25, 1965,
40/79,671
7 Claims. (Cl. 188—134)

This invention relates to brake mechanism for retarding the rotation of a shaft or other rotating means by selectively applying a reverse torque thereto.

Brake mechanisms commonly retard rotation by frictional engagement and conventional brakes accordingly generate heat and are subject to substantial wear. The present invention accomplishes the desired retardation of a rotating body by applying a reverse torque thereto, thus avoiding the fractional heat and wear normally encountered in brake mechanisms.

While a single specific embodiment of the principles of the present invention is illustrated in the accompanying drawing and described in detail in the following specification, it is to be underestood that such embodiment is by way of example only and that various mechanical modifications may be made without departing from the spirit of the invention, the scope of which is limited only as defined in the appended claims.

In the drawings:

FIG. 6 is a longitudinal sectional view of one embodiment of the brake mechanism of the present invention;

Figure 1:
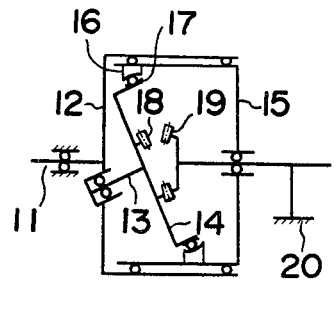
FIGS. 1 through 5 are diagrammatic views showing the schematic relationship of the parts of one form of the apparatus of the present invention.
Figure 2:
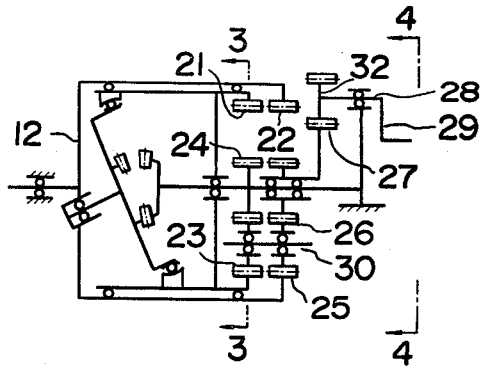
Figure 3:
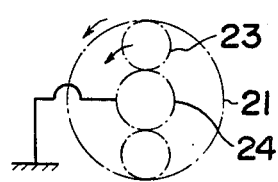
Figure 4:
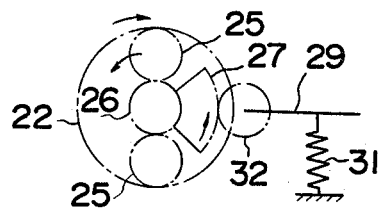
Figure 5:
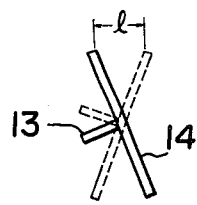

Referring particularly to FIG. 6, a shaft 11 which is to be controlled is journalled in a bearing 11a in a housing 20 and has a cylindrical block 12 fixed thereto. A shaft 13 is journaled in block 12 on an oblique axis which intersects the axis of shaft 11 and block 12. Shaft 13 has a bevel gear 18 formed thereon and a ball race member or ring 14 is fixed to gear 18, the ball race member lying in a plane at right angles to the axis of shaft 13, which plane intersects the axis of shaft 13 at the point where such axis intersects the axis of shaft 11 and block 12.

A bevel gear 19 of the same number of teeth as bevel gear 18 meshes therewith and is fixed to housing 20 coaxial with shaft 11. Upon rotation of shaft 11 and block 12 the axis of shaft 13 and gear 18 is caused to describe a conical path but rotation of shaft 13 and ball race 14 are prevented by the meshing of bevel gear 18 with stationary bevel gear 19.

Figure 7:
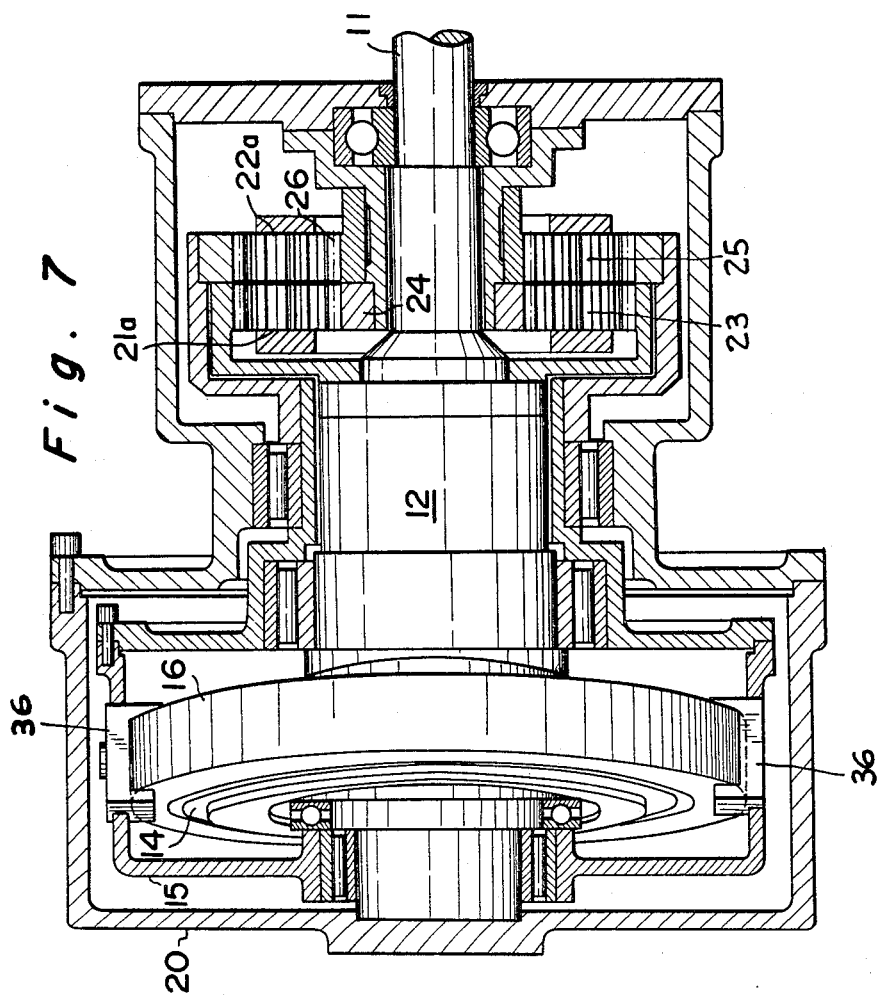
FIG. 7 is a longitudinal sectional view of the apparatus of FIG. 6 taken on a plane at right angles to FIG. 6 and partly in elevation.
Figure 8:
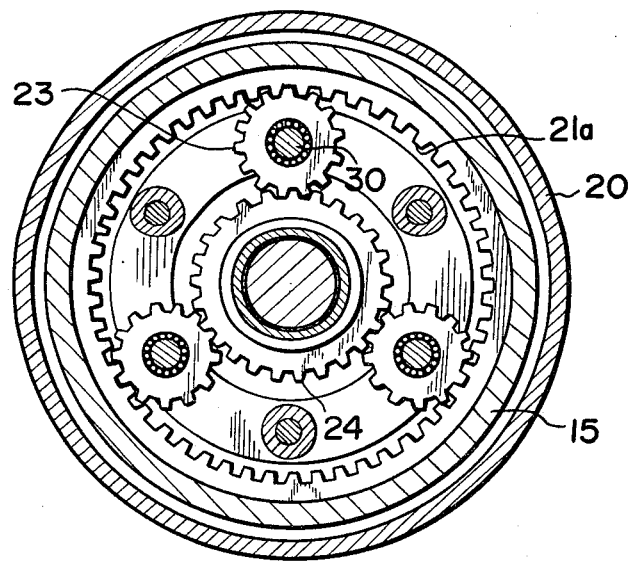
FIG. 8 is a cross-sectional view taken generally on the line 8—8 of FIG. 6.

A housing 15 is mounted for rotation coaxial with shaft 11 by means of anti-friction bearings 15a and 15b and has an internally toothed ring gear 22a fixed thereto. An outer ball race or ring 16 is fixed with respect to housing 15 by blocks designated 36 in FIG. 7. Balls 17 connect the inner race or ring 14 and the outer race or ring 16 so that they always lie in the same plane although they are freely rotatable with respect to each other.

Figure 9:
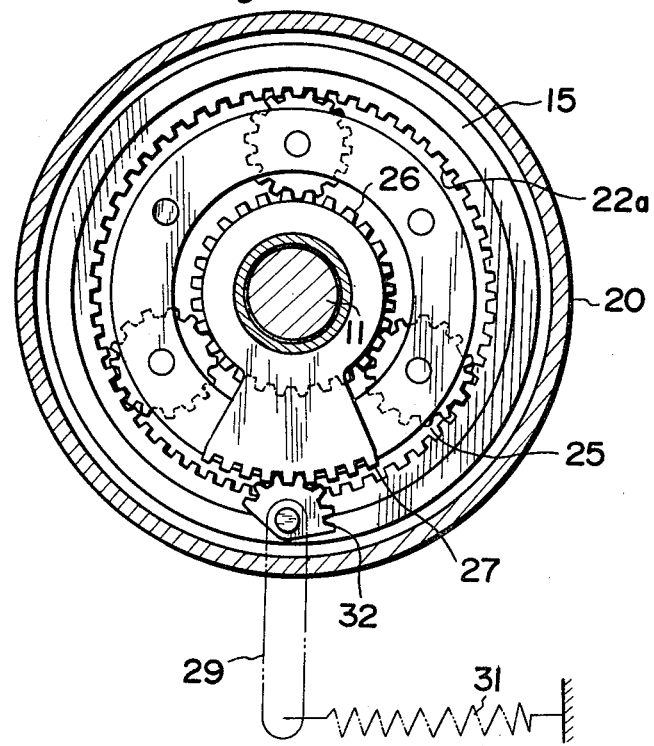
FIG. 9 is a cross-sectional view taken generally on the line 9—9 of FIG. 6.

An internally toothed ring gear 21a of the same diameter and number of teeth as the ring gear 22a is fixed to block 12 for rotation therewith. A sun gear 24 is fixed to a sleeve 24a and a second sun gear 26 is rotatable on sleeve 24a but is normally stationary and carries a sector 27 which meshes with a control pinion 32 having an operating handle 29 which is urged in one direction by an extension spring 31 as shown in FIG. 9.

Planet pinions 23 and 25 which mesh with the sun gears 24 and 26, respectively, and with internal gears 21a and 22a, respectively, are freely rotatable relative to each other and are mounted on spindles 30 carried by rings 35.

In normal operation the sun gear 26 is stationary, as in sun gear 24. The ring gear 21a rotates with shaft 11 and block 12 and accordingly, by operation of planet pinions 23 and 25, ring gear 22a carried by housing 15 rotates in unison with ring gear 21a. Rotation of block 12 causes the axis of non-rotatable shaft 13 to describe a conical path whereby ring 14 wobbles. Since outer ring 16 rotates with housing 15 at the same speed as block 12, it likewise wobbles synchronously with inner ring 14, although ring 14 is non-rotatable and ring 16 rotates with housing 15.

Under the foregoing conditions there is no resistance to the free rotation of shaft 11. However, if a rotational force is applied to pinion 32 by handle 29, and thus to sector 27 and sun gear 26, this rotational force is transmitted to ring gear 22a, housing 15 and ring 16. Thus such force tends to wobble ring 16 and shaft 13 out of synchronism with the wobble produced by shaft 11 and block 12.

Thus an opposing torque is applied to block 12 and shaft 11 by the force tending to wobble shaft 13 in block 12 at a different rate than that produced solely by the free rotation of block 12. This opposing torque serves as an effective frictionless brake.

I claim:

1. A rotating member and means for applying a reverse torque thereto comprising a shaft journaled in said rotating member on an axis intersecting the axis of said rotating member, means restraining said shaft against rotation while permitting conical movement thereof, a ring member coaxial with said shaft and rotatable thereon, said ring member being normally free to wobble with said shaft upon rotation of said rotating member, gear means acting between said rotating member and said ring member normally rotating the latter synchronously with said rotating member, and means for selectively applying a torque force to said gear means tending to vary the synchronous rotation of said ring member and thus vary the synchronous wobbling thereof with said shaft and thereby apply a reverse torque to said rotating member by way of said obliquely journaled shaft.

2. Apparatus according to claim 1 wherein said gear means comprises a planetary gear train driven by said rotating member and an identical planetary gear train driven by the first gear train for driving said ring member synchronously with said rotating member, said selective torque applying means acting upon said planetary gear trains to vary their synchronous relationship.

3. Apparatus according to claim 1 wherein said restraining means comprises a pair of identical meshing bevel gears, one fixed coaxially to said shaft and the other fixed coaxially with respect to said rotating member.

4. Apparatus according to claim 2 wherein said restraining means comprises a pair of identical meshing bevel gears, one fixed coaxially to said shaft and the other fixed coaxially with respect to said rotating member.

5. Apparatus according to claim 2 wherein the first planetary gear train comprises a fixed sun gear and a ring gear fixed to said rotating member and the second planetary gear train comprises a normally fixed sun gear and a ring gear fixed to said ring member, said two gear trains having coaxial planet pinions.

6. Apparatus according to claim 5 wherein said selective torque means comprises means for applying a rotational force to the normally fixed sun gear of said second gear train.

7. Apparatus according to claim 5 wherein said restraining means comprises a pair of identical meshing bevel gears, one fixed coaxially to said shaft and the other fixed coaxially with respect to said rotating member.

References Cited
UNITED STATES PATENTS 1,582,076    4/1926    Page _____ 74—800 X
1,587,298    6/1926    Gilman _____ 74—800 X FRED C. MATTERN, Jr., *Primary Examiner.*

ARTHUR T. McKEON, *Examiner.*